United States Patent [19]

Muranaka

[11] Patent Number: 4,888,542
[45] Date of Patent: Dec. 19, 1989

[54] DRIVING METHOD OF A STEPPING MOTOR

[75] Inventor: Akinori Muranaka, Fujieda, Japan

[73] Assignee: Star Seimitsu Kabushiki Kaisha, Shizuoka, Japan

[21] Appl. No.: 217,986

[22] Filed: Jul. 12, 1988

[30] Foreign Application Priority Data

Jul. 14, 1987 [JP] Japan .................................. 62-175650

[51] Int. Cl.⁴ ............................................. H02P 8/00
[52] U.S. Cl. ..................................... 318/696; 318/685
[58] Field of Search ................................. 318/696, 685

[56] References Cited

U.S. PATENT DOCUMENTS

| 4,603,287 | 7/1986 | Setoya | 318/696 |
| 4,607,208 | 8/1986 | Setoya | 318/696 |
| 4,739,239 | 4/1988 | Krause et al. | 318/685 |

Primary Examiner—William M. Shoop, Jr.
Assistant Examiner—Saul M. Bergmann
Attorney, Agent, or Firm—Oblon, Spivak, McClelland, Maier & Neustadt

[57] ABSTRACT

The present invention relates to a driving method of a stepping motor, wherein the hold position of the motor does not change and further no complicated control is required in controlling current for economizing power consumption by controlling the coil current in a manner that the balance of torque may not be disturbed by excitation winding.

5 Claims, 3 Drawing Sheets

| TR BASE — DRIVE PULSE | T1 | T2 | T3 | T4 | T5 | T6 | T7 | T8 | T9 | T10 |
|---|---|---|---|---|---|---|---|---|---|---|
| PA | 1 | 0 | 0 | 0 | 0 | 0 | 1 | 1 | 1 | 1 |
| PC | 1 | 1 | 1 | 0 | 0 | 0 | 0 | 0 | 1 | 1 |
| PE | 1 | 1 | 1 | 1 | 1 | 0 | 0 | 0 | 0 | 0 |
| PB | 0 | 0 | 1 | 1 | 1 | 1 | 1 | 0 | 0 | 0 |
| PD | 0 | 0 | 0 | 0 | 1 | 1 | 1 | 1 | 1 | 0 |
| EXCITATION ON AT "1"; OFF AT "0" |||||||||||
| MOTOR ROTATION ⎯⎯⎯⎯⎯⎯⎯⎯→ |||||||||||

DRIVING METHOD OF A STEPPING MOTOR

FIELD OF THE INVENTION AND RELATED ART STATEMENT

The present invention relates to a driving method of a stepping motor.

Hitherto, as is conventionally known, a stepping motor rotates by stepping rotation at fixed angles whenever the windings of its phases are excited one after another upon receiving the drive pulses. There are various proposals for reducing the power consumption such as by controlling the flow of a large excitation current during the period of rotation of the stepping motor (hereinafter referred to as step time) and further by controlling the excitation current at a minimum value required for maintaining the stop position during the period that the motor is not rotating (hereinafter referred to as stop time).

In Japanese Patent Laid-Open Publication No. 70318/1982, it was proposed to reduce the power consumption of a stepping motor by stopping the motor once and then controlling the current flowing through the winding of one of the two phases selected during the stop time.

However, this method as a drawback that the balance of the torque generated by the excited winding is disturbed due to the control of the current, and as a result the stop position of said motor changes. Moreover, in order to economize the power consumption, there is a further drawback that a complicated control such as stopping surely said motor once so as to control the current and further such as proceeding to a next rotational operation after going to said two-phase excitation state in order to modify a changed stop position to said original stop position at the time for restarting the motor, becomes necessary.

OBJECT AND SUMMARY OF THE INVENTION

With the above background in mind, it is an object of the present invention to provide a driving method of a stepping motor in which no complicated control is required in controlling the current for economizing the power consumption.

Another object of the present invention is to provide a driving method of a stepping motor in which the current is controlled so as not to disturb the balance of the torque.

The above-mentioned objects of the present invention can be achieved by providing a driving method of a stepping motor comprising a current control means for controlling the current of the windings. One phase vector is generated by the current through one winding. Phase vectors other than a phase vector having the same direction as that of an excitation vector by composing a plurality of phase vectors or phase vectors other than phase vectors being added to yield resultant vector having the same direction as that of said excitation vector are generated. The current is thereby broken or reduced by means of said current control means at the final excitation period of said motor.

According to the present invention, it is effective to economize the current consumption of a stepping motor without any need for complicated control and further without changing the stop position by controlling the current without disturbing the balance of the torque.

DETAILED DESCRIPTION OF THE PREFERRED EMBODIMENTS

Hereinafter, embodiments according to the present invention will be described in detail with reference to the drawings.

Figure 3:
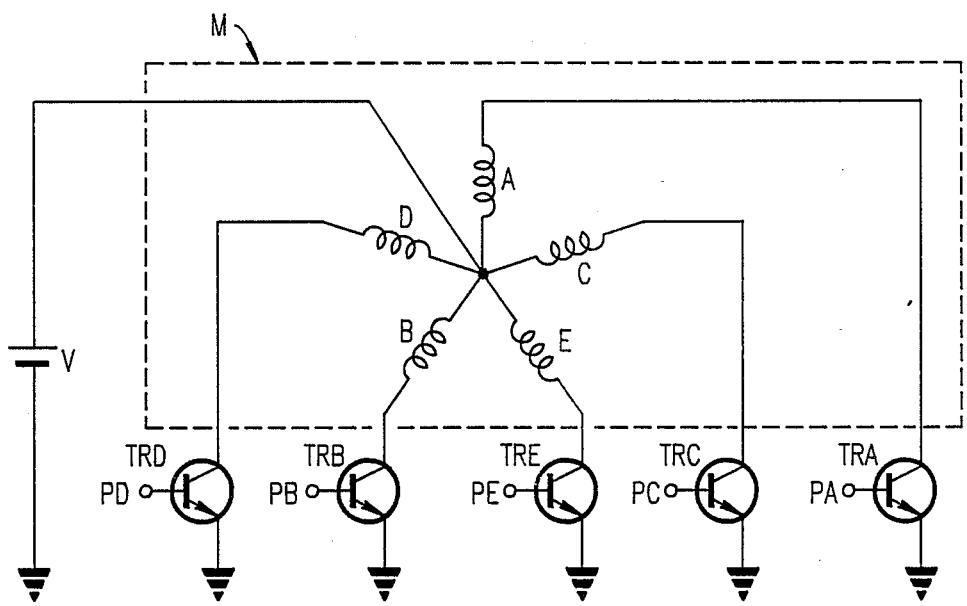
FIG. 3 is a drive circuit of a conventional 5-phase stepping motor.

Among the Figures, FIG. 3 is a drive circuit of a five-phase stepping motor. Said circuit is well known as a unipolar connection—star drive system. In said Figure, M is the five-phase stepping motor consisting of windings of phase A, Phase B, phase C, phase D and phase E. One end of each of the windings are connected together and connected to a power supply V. The other end of each winding is connected to the collector of a respective switching transistor. That is to say, the winding of phase A is connected to the collector of a transistor TRA, the winding of phase B to the collector of a transistor TRB, the winding of phase C to the collector of a transistor TRC, the winding of phase D to the collector of transistor TRD and that of a phase E to the collector of a transistor TRE. The emitters of all of these switching transistors are connected to ground, as is the other terminal of the power supply V and excitation signals PA, PB, PC, PD and PE are applied to the bases of said transistors for driving the stepping motor M.

Figure 2:
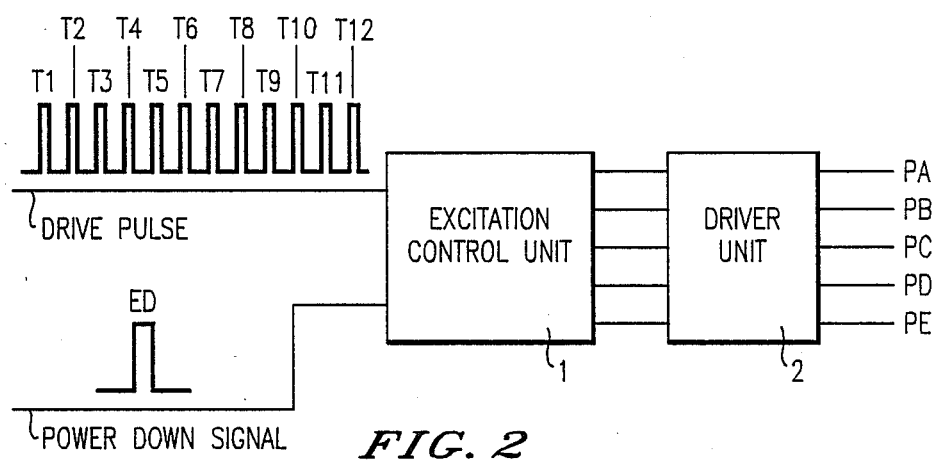
FIG. 2 is a control circuit for economizing the current consumption of the stepping motor according to the present invention.

FIG. 2 is a control circuit used for economizing the power consumption of the stepping motor according to the present invention. In said Figure, 1 is an excitation control unit which generates the excitation signals PA, PB, PC, PD and PE by inputting drive pulses T1 to T10 according to an excitation sequence illustrated in FIG. 4 and further controls said excitation signals by a power down signal ED. 2 is a driver unit for amplifying the excitation signals output from the excitation control unit 1 and then supplying the same to the bases of the switching transistors of the drive circuit illustrated in FIG. 3. When the drive pulses T1 to T10 are input to the excitation control unit 1, the excitation signals PA, PB, PC, PD and PE are output from said excitation control unit according to the 2-3 phase excitation sequence illustrated in FIG. 4. Said output excitation signals are amplified by the driver unit 2 and are fed to the bases of the switching transistors of the drive circuit illustrated in FIG. 3 so as to control the drive of the motor M. The power down signal ED is used to control said excitation signals.

Figures 4, 5:
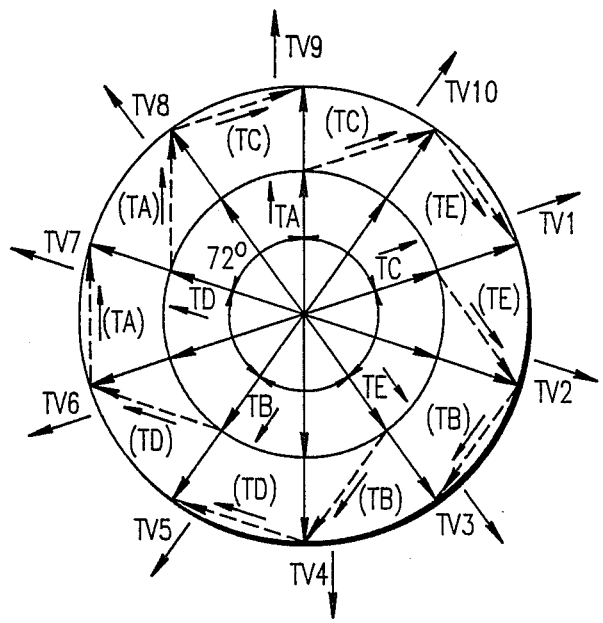
FIG. 4 is a conventional 2-3 phase excitation sequence diagram.
FIG. 5 is a vector diagram of torques in the 2-3 phase excitation.

When the drive pulses T1 and T10 are input to the excitation control unit 1 according to the 2-3 phase excitation sequence illustrated in FIG. 4, torques of respective direction are produced in the windings of phase A, phase B, phase C, phase D and phase E of the motor M. These torques having the above direction can be represented by vector notation. (Hereinafter this vector is referred to as a phase vector.) That is to say, the torques generated from the windings of phase A, phase B, phase C, phase D and phase E of the motor M are represented by the phase vectors $\vec{TA}, \vec{TB}, \vec{TC}, \vec{TD}$ and $\vec{TE}$ respectively. When represented by a vector diagram shown in FIG. 5, these phase vectors have a phase difference of an 72° of electrical angle and represent the excitation positions of the stator of the motor M. In the case where the windings are excited by 2-3 phase excitation system, three phases i.e. phase A, phase C and phase E are excited by the drive pulse T1 and hence three phase vectors $\vec{TA}, \vec{TC}$ and $\vec{TE}$ are generated. The position of the motor M is determined by the resultant vector which is the sum of these phase vectors. Supposing the resultant vector in this case to be $\vec{TV1}$, the position is determined by $\vec{TV1} = \vec{TA} + \vec{TC} + \vec{TE}$. As regards the drive pulse T2, since two phase i.e. phase C and phase E are excited by this pulse, the phase vectors $\vec{TC}$ and $\vec{TE}$ are generated and the position of the motor M is determined by the resultant vector $\vec{TV2} = \vec{TC} + \vec{TE}$.

Likewise, supposing the resultant vectors generated by the drive pulses T3 to T10 are $\vec{TV3}$ to $\vec{TV10}$, the relationship between the resultant vector and the phase vectors produced for each drive pulse is shown in Table 1, wherein the resultant vectors TV1 to TV10 for positioning are called the excitation vectors.

TABLE 1

| | Phase vector generated from each phase | | |
|---|---|---|---|
| Drive pulse | phase vectors having the direction different from that of excitation vector | Phase vector having the same direction as that of the excitation vector | excitation vector |
| T1 | $\vec{TA} + \vec{TE}$ | $+ \vec{TC}$ | $\vec{TV1}$ |
| T2 | $\vec{TC} + \vec{TE}$ | | $\vec{TV2}$ |
| T3 | $\vec{TB} + \vec{TC}$ | $+ \vec{TE}$ | $\vec{TV3}$ |
| T4 | $\vec{TB} + \vec{TE}$ | | $\vec{TV4}$ |
| T5 | $\vec{TD} + \vec{TE}$ | $+ \vec{TB}$ | $\vec{TV5}$ |
| T6 | $\vec{TB} + \vec{TD}$ | | $\vec{TV6}$ |
| T7 | $\vec{TA} + \vec{TB}$ | $+ \vec{TD}$ | $\vec{TV7}$ |
| T8 | $\vec{TA} + \vec{TD}$ | | $\vec{TV8}$ |
| T9 | $\vec{TC} + \vec{TD}$ | $+ \vec{TA}$ | $\vec{TV9}$ |
| T10 | $\vec{TA} + \vec{TC}$ | | $\vec{TV10}$ |

As shown in the Table, as the drive pulse repeatedly changes from T1 to T10, the excitation vectors change from $\vec{TV1}$ to $\vec{TV10}$ and thus the motor M rotates. Paying attention to the phase vectors produced from each of the phases as shown in Table 1, it can be found that the drive pulses of odd numbers (T1,T3,T5,T7,T9) always possess a phase vector having the same direction as that of the excitation vector. For example, in the case of the drive pulse T1, three phase vectors of $\vec{TA}, \vec{TE}$ and $\vec{TC}$ are generated. Among these phase vectors, $\vec{TC}$ has the same direction as the excitation vector $\vec{TV1}$ though it differs in a torque amplitude. Now, supposing that the drive pulse at the time when the motor M stops is T1, then the position of said motor M is determined by the excitation vector $\vec{TV1} = \vec{TA} + \vec{TE} + \vec{TC}$. Since the excitation vector $\vec{TV1}$ and the phase vector $\vec{TC}$ have the same direction, the stop position of the motor M will not change at all even when the stop position is held by means of the phase vector TC only, merely changing the holding torque amplitude. There, the coil current can be reduced to one-third because the current of the phase A and phase E can be broken. The breaking of said current is controlled by the power down signal ED and by inputting said signal ED to the excitation control unit 1 it is possible to break the current of the phase vectors having a direction different from that of the excitation vector at the time of the odd drive pulses in Table 1.

Figure 1:
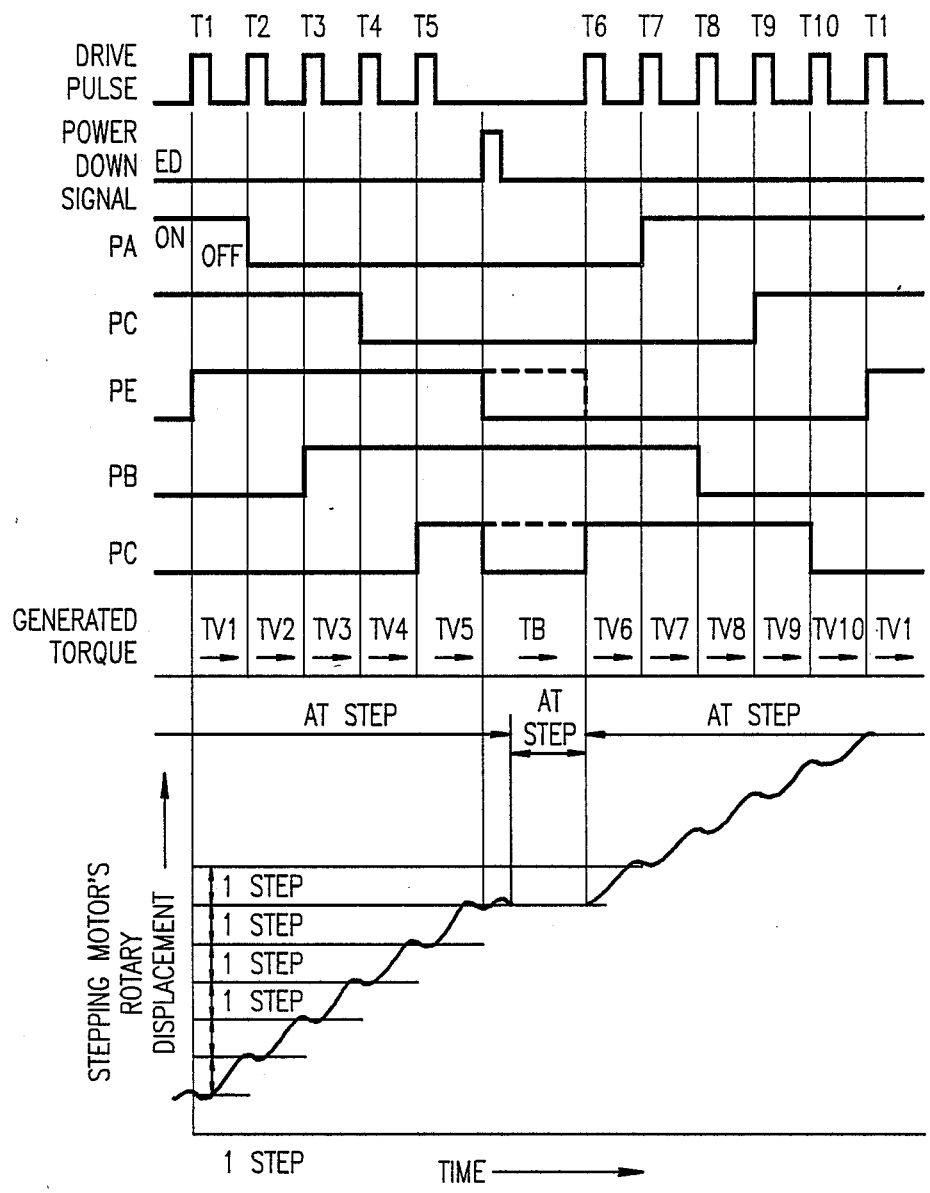
FIG. 1 is a timing chart which shows the method of economizing the current consumption of a stepping motor according to the present invention.

Following is a detailed description concerning the method of economizing the power consumption of the stepping motor according to the present invention with reference to FIG. 1, wherein the power consumption is reduced by stopping the motor M by means of the drive pulse T5 and restarting the motor by the drive pulse T6. When the motor M gradually enters into the stopping process by means of the drive pulses T1 to T5, the excitation vector changes as $\vec{TV1}$ through $\vec{TV5}$ and the stop time comes at the time of the drive pulse T5 which is the final excitation period; and the motor M is held by means of the excitation vector $\vec{TV5} = \vec{TE} + \vec{TB} + \vec{TD}$. At that time, if the power down signal ED is input to the excitation control unit 1, the current of each of the windings of phases D and E is broken and hence the phase vectors $\vec{TE}$ and $\vec{TD}$ disappear and the motor M is held only by means of the phase vector $\vec{TB}$; and therefore the current at the time of the stop time is reduced to one-third. Next, when restarting the motor M, it can be driven by continuously inputting the drive pulses T6 to T10 one by one. Therefore, according to the present invention, for reducing the current of the motor M, the rotational displacement does not change at all as illustrated in FIG. 1 and no complicated control is necessary to break the current or restart the motor.

As described hereinabove, at the time of generation of the odd-numbered drive pulses for economizing the power consumption, the current is shown only in the phase of the phase vector having the same direction as that of the excitation vector the windings current and of the other phases are broken. Furthermore, the resultant vector generated from two of the component phase vectors is able to controlled to have the same direction as that of the excitation vector and further to have the same absolute values as said phase vectors in accompany with the generation of even-numbered drive pulses, thereby combining the same with the controlling method at the time of generation of the odd-numbered drive pulses described above.

In Table 1, when paying attention to the resultant vector generated from the phase vectors having the direction different from that of the excitation vector at the time of each drive pulse, it can be found that each of the resultant vectors has the same direction as that of the each excitation vector. Therefore, it is possible to hold the motor M by means of a holding force based on said resultant vector by breaking the current of the phase vector having the same direction as that of the excitation vector in the case of drive pulses of the odd number. However, this case is not practical because the holding force becomes even less than the previously described case in which a positioning is performed by means of only the phase vector having the same direction as that of the excitation vector, despite the fact that the current consumption reduces to two-third. As regards the methods of economizing the current consumption other than the method of breaking the current, either the current of a phase may be controlled in the case where the phase vector of said phase has the same direction as that of the excitation vector or the current consumption can be reduced by controlling the current of phases in a manner that the resultant vector of obtained by combining the vectors of said phases has the same direction as that of the excitation vector. Moreover, it is also possible to carry out in a manner that the control and the break of said winding currents are combined. According to the method of the present invention, it can be used in the case where a stepping motor changes from the step time to the stop time as well as in the case of the temporarily stop time.

What is claimed is:

1. In a driving system of a stepping motor, wherein an excitation winding is arranged for each of a plurality of phases and current is supplied to each of said windings by an excitation system including at least three phases in an excited state according to an excitation sequence when a drive pulse is input so as to produce a torque which yields a phase vector from the winding to which the current is supplied, thereby producing an excitation vector by adding said vectors, and said motor is driven by controlling the current supplied to said each winding means of said excitation system together with the input of said drive pulse so as to rotate said excitation vector, a method for driving a stepping motor comprising the steps of:

at a final excitation period of said motor, breaking or reducing the current supplied to the windings which produce phase vectors other than the winding which produces a phase vector having the same direction as that of said excitation vector or, when the vector resulting from the addition of phase vectors from windings which produce phase vectors having directions different from that of said excitation vector, has the same direction as that of said excitation vector, breaking or reducing the current supplied to the winding which produces the phase vector.

2. The method for driving a stepping motor according to claim 1, wherein at a final excitation period of said motor each of said windings to be excited is selected so as to hold said motor at a target stop position according to an excitation sequence.

3. The method according to claim 1, wherein said motor may be restarted without changing the rotational displacement thereof.

4. The driving method of a stepping motor according to claim 1, wherein said current of the windings is controlled so as not to disturb the balance of torque.

5. The driving method of a stepping motor according to claim 1, wherein said driving method can be carried out at the time when said motor proceeds to the step time from the step time or at the stop time after said motor is stopped.

* * * * *